(12) United States Patent
Fujita

(10) Patent No.: US 8,274,548 B2
(45) Date of Patent: Sep. 25, 2012

(54) NETWORK CAMERA SYSTEM

(75) Inventor: Shunji Fujita, Kawasaki (JP)

(73) Assignee: Canon Kabushiki Kaisha (JP)

( * ) Notice: Subject to any disclaimer, the term of this patent is extended or adjusted under 35 U.S.C. 154(b) by 1352 days.

(21) Appl. No.: 11/873,284

(22) Filed: Oct. 16, 2007

(65) Prior Publication Data

US 2008/0088699 A1    Apr. 17, 2008

(30) Foreign Application Priority Data

Oct. 16, 2006  (JP) .................................. 2006-281525

(51) Int. Cl.
*H04N 7/00*    (2011.01)
(52) U.S. Cl. ............................................. 348/36
(58) Field of Classification Search ...................... 348/36
See application file for complete search history.

(56) References Cited

U.S. PATENT DOCUMENTS

| | | | | |
|---|---|---|---|---|
| 4,802,747 A * | 2/1989 | Horiuchi | ................. | 359/687 |
| 5,563,676 A * | 10/1996 | Kosaka et al. | ................. | 396/51 |
| 5,694,624 A * | 12/1997 | Daitoku et al. | ................. | 396/60 |
| 5,864,360 A * | 1/1999 | Okauchi et al. | ................. | 348/47 |
| 7,023,913 B1 * | 4/2006 | Monroe | ................. | 375/240.01 |
| 7,136,096 B1 * | 11/2006 | Yamagishi et al. | ........ | 348/218.1 |
| 7,277,118 B2 * | 10/2007 | Foote | ................. | 348/36 |
| 7,518,636 B2 * | 4/2009 | Endo et al. | ............ | 348/208.99 |
| 7,733,371 B1 * | 6/2010 | Monroe | ................. | 348/153 |
| 2004/0023722 A1 * | 2/2004 | Vuong et al. | ............ | 463/40 |
| 2005/0049509 A1 * | 3/2005 | Mansour et al. | ............ | 600/476 |
| 2005/0207487 A1 * | 9/2005 | Monroe | ............ | 375/240.01 |
| 2007/0002131 A1 * | 1/2007 | Ritchey | ................. | 348/39 |
| 2007/0182819 A1 * | 8/2007 | Monroe | ................. | 348/143 |
| 2007/0189747 A1 * | 8/2007 | Ujisato et al. | ............ | 396/72 |
| 2008/0007617 A1 * | 1/2008 | Ritchey | ................. | 348/37 |

FOREIGN PATENT DOCUMENTS

| | | | |
|---|---|---|---|
| JP | 09-116806 A | | 5/1997 |
| JP | 10-233950 A | | 9/1998 |
| JP | 11-008845 A | | 1/1999 |
| JP | 2001-136514 A | | 5/2001 |

* cited by examiner

*Primary Examiner* — Douglas Blair

(74) *Attorney, Agent, or Firm* — Rossi, Kimms & McDowell LLP

(57) ABSTRACT

A network camera system which is capable of generating a panoramic image by smooth or seamless connection of images, even when a network camera having a wide-angle lens is used. A network camera system includes a network camera that has a wide-angle lens which can be controlled for zooming, and a PC that is connected to the image pickup device via a network, for controlling the network camera. The PC comprises a panoramic image generation unit for generating a panoramic image by connecting a plurality of images picked up by the network camera and a remote zoom unit for causing the wide-angle lens of the image pickup device to move to a predetermined position when the network camera system is in a panoramic shooting mode.

3 Claims, 13 Drawing Sheets

| SENDER ADDRESS | RECIPIENT ADDRESS | ZM | x |

*FIG. 5A* ZOOM REQUEST

| SENDER ADDRESS | RECIPIENT ADDRESS | PAN | θ |

*FIG. 5B* PAN ANGLE CHANGE REQUEST

| SENDER ADDRESS | RECIPIENT ADDRESS | TLT | φ |

*FIG. 5C* TILT ANGLE CHANGE REQUEST

| SENDER ADDRESS | RECIPIENT ADDRESS | PIC |

*FIG. 5D* STILL IMAGE PICKUP AND DELIVERY REQUEST x=1 x=xd

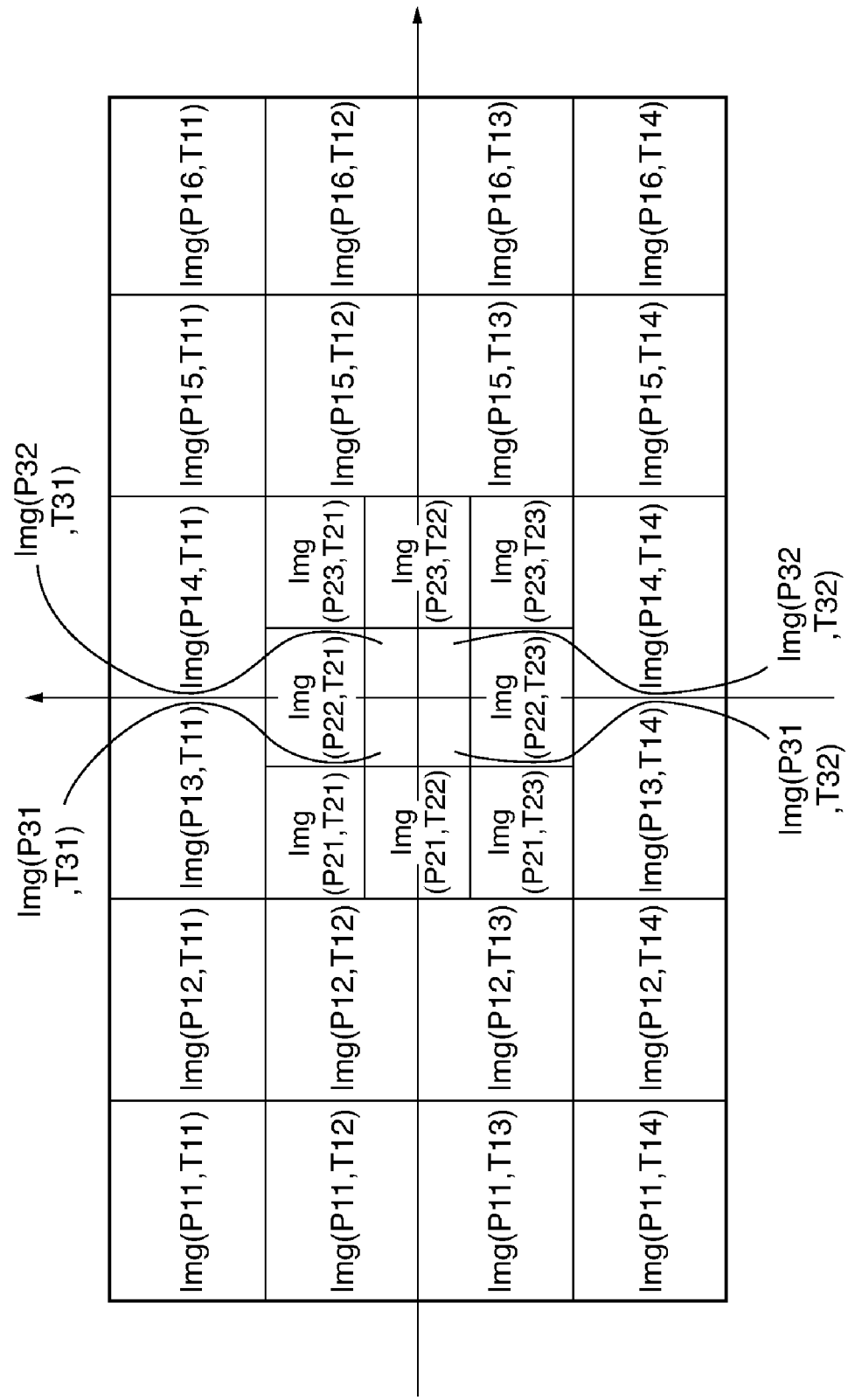

NETWORK CAMERA SYSTEM

BACKGROUND OF THE INVENTION

1. Field of the Invention

The present invention relates to a network camera system comprising an image pickup device, and a control device, which are connected by a network, for generating a panoramic image.

2. Description of the Related Art

Recently, network camera systems have come into wide use. The network camera systems include, for example, a security camera system in which a camera is disposed at the front door or the gate of a house for the purpose of monitoring the same, and a Web camera system in which a camera is disposed at a location within a famous sightseeing spot, for distributing images of the spot to users at remote locations via the Internet in real time.

In general, a wide-angle lens or a ultra wide-angle lens is often used for a lens of such a network camera, so as to have a wide viewable range.

On the other hand, there has been proposed a network camera which has a panoramic shooting mode for picking up images within the entire viewable range of the camera, and connecting the images into one panoramic image. This enables the administrator of the network camera to easily grasp objects in the viewable range of the network camera by panning and tilting thereof. The panoramic shooting mode has been proposed e.g. in Japanese Laid-Open Patent Publication (Kokai) No. 11-8845.

However, when the network camera having the aforementioned wide-angle lens performs panoramic shooting, images picked up by the network camera suffer from distortions peculiar to the wide-angle lens, such as barrel distortion and pincushion distortion, and the prior art cannot ensure a smooth or seamless connection of the images.

SUMMARY OF THE INVENTION

The present invention provides a network camera system which is capable of generating a panoramic image by smooth or seamless connection of a plurality of images, even when a network camera having a wide-angle lens is used.

The present invention provides a network camera system comprising an image pickup device that has a wide-angle lens which can be controlled for zooming, and a control unit that is connected to the image pickup device via a network, for controlling the image pickup device, wherein the control unit comprises a panoramic image generation unit configured to generate a panoramic image by connecting a plurality of images picked up by the image pickup device, and a remote zoom unit configured to cause the wide-angle lens of the image pickup device to move to a predetermined position when the network camera system is in a panoramic shooting mode.

The network system according to the invention comprises an image pickup device having a wide-angle lens which can be controlled for zooming, and a control device connected to the image pickup device via a network, for controlling the image pickup device. The control device comprises a panoramic image generation unit that generates a panoramic image by connecting a plurality of images picked up by the image pickup device, and a remote zoom unit that causes the wide-angle lens of the image pickup device to a predetermined position when in a panoramic shooting mode.

With such a configuration of the network camera system, it is possible to generate a panoramic image by smooth or seamless connection of images, even when a network camera having a wide-angle lens is used.

The predetermined position to which the wide-angle lens of the image pickup device is caused to move by the remote zoom unit can be a position wherein distortion of the wide-angle lens is reduced.

The remote zoom unit can change a distance over which the wide-angle lens is moved, depending on a position of an image to be picked up, within the panoramic image.

The remote zoom unit can perform zooming such that distortion of central ones of the images from which the panoramic image is formed is most reduced, and images closer to a periphery of the panoramic image are picked up by zooming with a lower zoom magnification.

The remote zoom unit can perform zooming such that distortion of peripheral ones of the images from which the panoramic image is formed is most reduced, and images closer to the center of the panoramic image are picked up by zooming with a lower zoom magnification.

The panoramic image generation unit can generate the panoramic image by connecting the images picked up by the image pickup device, and connecting predetermined images to the connected images, for regions of which images cannot be picked up due to zooming.

The predetermined images can be either copies of images at ends of the panoramic image which are picked up by the image pickup device or colored images.

The remote zoom unit is configured to be operable when a user designates a panoramic image generation range, to determine a zoom magnification such that the panoramic image can be generated from only the images picked up by the image pickup device, and perform zoom control with the zoom magnification.

The features and advantages of the invention will become more apparent from the following detailed description taken in conjunction with the accompanying drawings.

BRIEF DESCRIPTION OF THE DRAWINGS

FIGS. 5A to 5D are views of demand packets delivered from the PC appearing in FIG. 1.

FIGS. 6A and 6B are views how distortion correction (distortion reduction) is performed by the network camera appearing in FIG. 1, in which FIG. 6A is a view of an image before being subjected to the distortion correction, and FIG. 6B is a view of an image after being subjected to the distortion correction.

FIG. 14 is a view of a panoramic image formed by the FIG. 13 panoramic image-generating process.

DETAILED DESCRIPTION OF THE PREFERRED EMBODIMENTS

The present invention will now be described in detail below with reference to the accompanying drawings showing preferred embodiments thereof.

Figure 1:
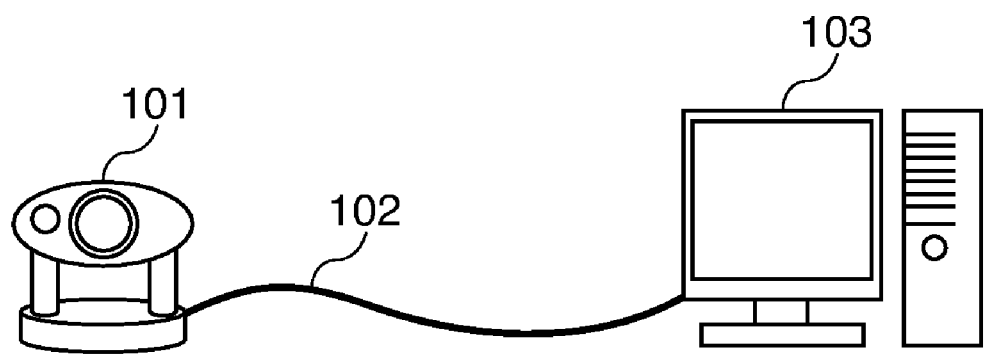
FIG. 1 is a conceptual view of a network camera system according to a first embodiment of the present invention.

FIG. 1 is a conceptual view of a network camera system according to an embodiment of the present invention.

As shown in FIG. 1, the network camera system according to the present embodiment is comprised of a network camera 101, and a PC (Personal Computer) 103, which are connected via a network 102.

Figure 2:
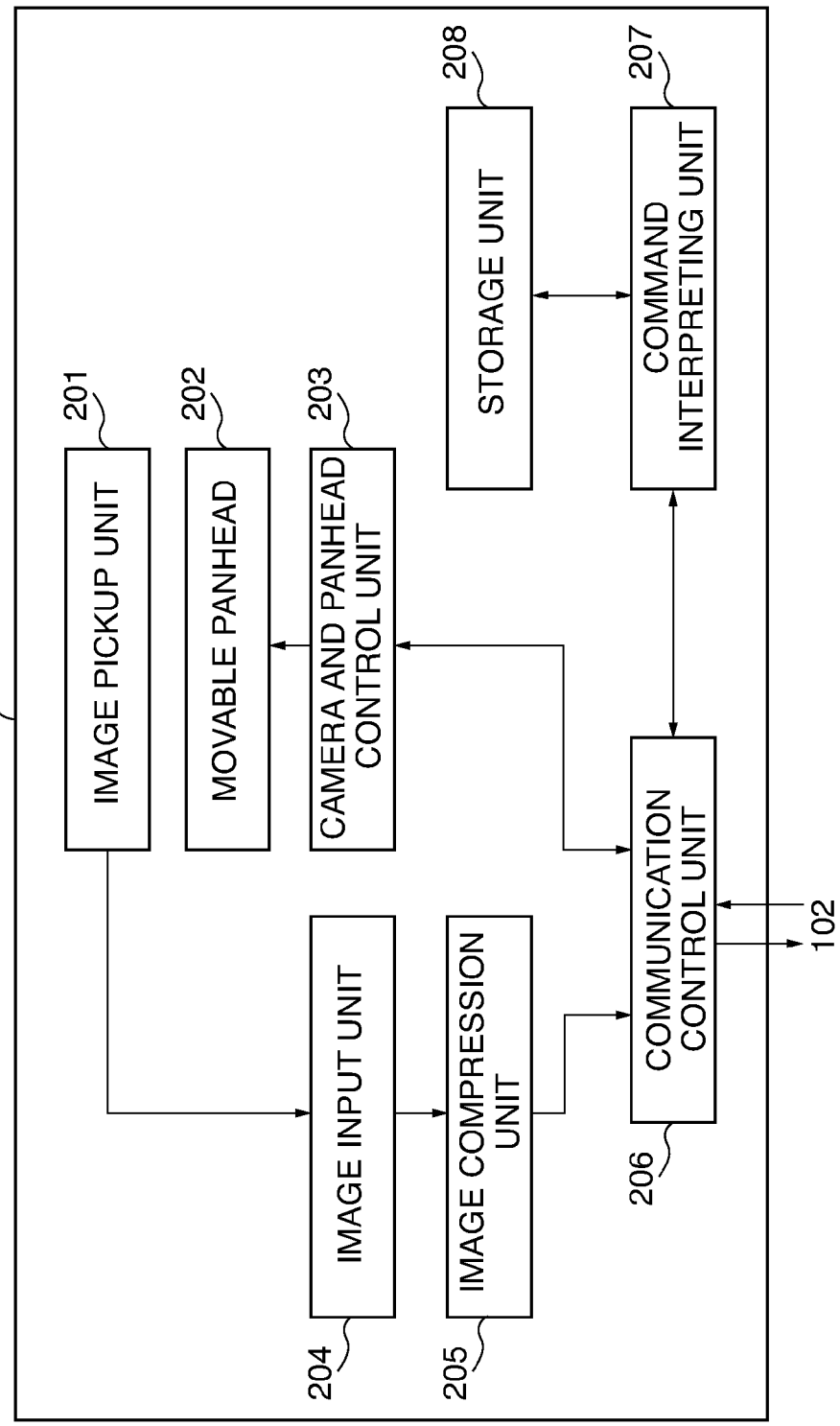
FIG. 2 is a block diagram of the internal construction of a network camera appearing in FIG. 1.

FIG. 2 is a block diagram of the internal construction of a network camera appearing in FIG. 1.

As shown in FIG. 2, the network camera 101 is comprised of an image pickup unit 201, a movable panhead 201 which changes pan and tilt angles of the image pickup unit 201, a camera and panhead control unit 203 that controls pan and tilt angles of the movable panhead 202.

Further, the network camera 101 includes an image input unit 204 that captures images (moving or still images) from the image pickup unit 201, an image compression unit 205 that compresses data of the captured images, and a communication control unit 206 that delivers compressed image data into the network 102.

Further, the network camera 101 includes a command interpretation unit 207 that receives a command sent from the PC 103 via the network 102, via the communication control unit 206, and interprets the command to control parts of the network camera 101, and a storage unit 208 that is used for passing data between parts of the network camera 101.

It should be noted that the image compression unit 205 captures an NTSC image signal input via the image input unit 204 from the image pickup unit 201, subjects the thus captured image data to analog-to-digital conversion, compresses the resulting digital data by MoTionJPEG, and passes the compressed data to the communication control unit 206 to send the same to the network 102. In the illustrated example, the method of compressing an image is MoTionJPEG compression, but the present invention is not limited to this compression method.

The network camera 101 captures an image from the image pickup unit 201 while controlling the movable panhead 202 based on a request from the PC 103. Further, the network camera 101 delivers a picture or an image from the image pickup unit 201 to the PC 103 which requested the delivery thereof and receives a camera control command from the PC 103 to control the movable panhead 202.

Figure 3:
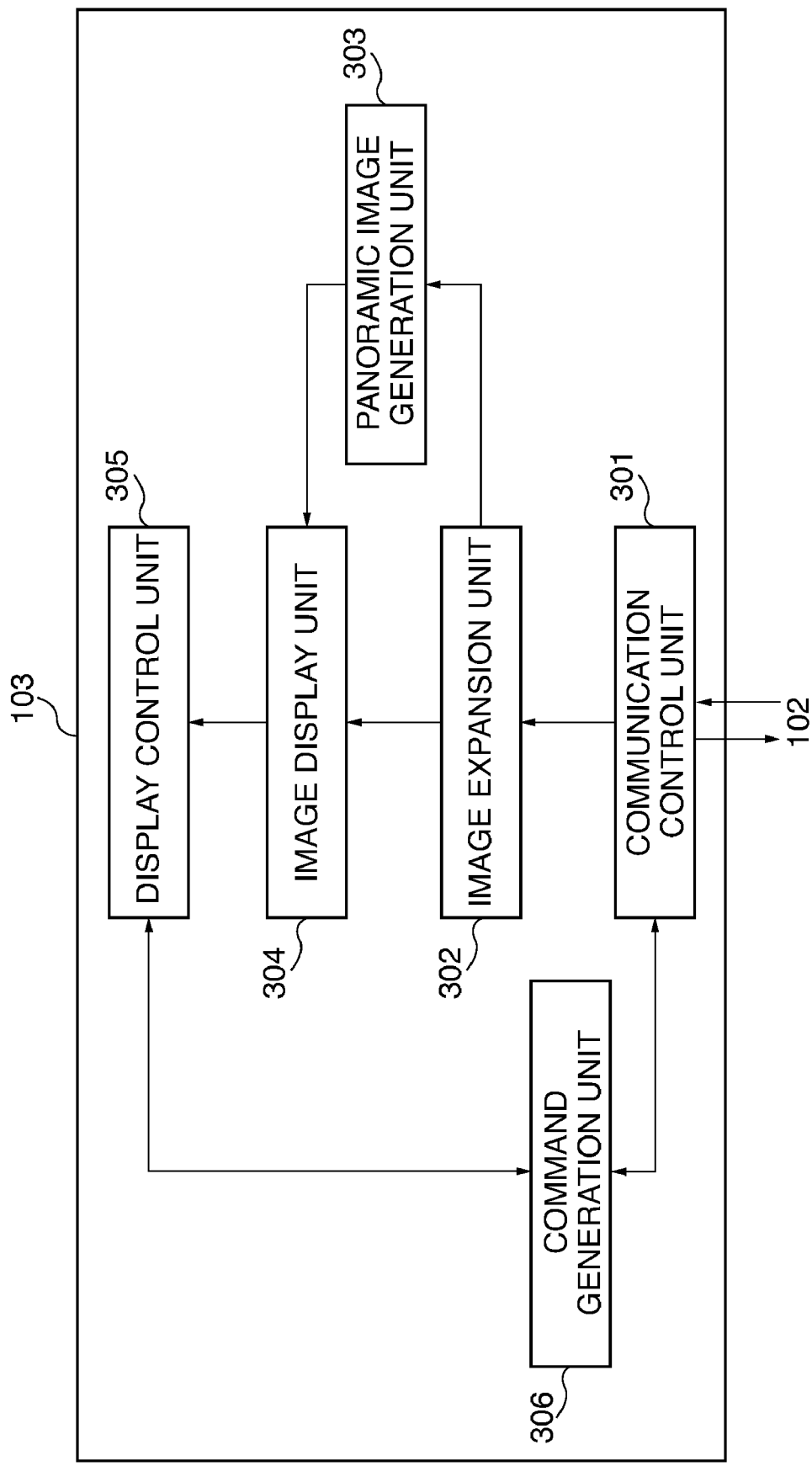
FIG. 3 is a block diagram of the internal construction of a PC appearing in FIG. 1.

The PC 103 connects the received images to form a panoramic image, and displays the panoramic image on an image display unit 304 (appearing in FIG. 3). It should be noted that the number of network cameras 101 and the number of PCs 103 connected to the network 102 are not particularly limited, but in the illustrated example, they are both assumed to be single for simplicity.

The network 102 may be of any type insofar as it is a digital network, e.g. the Internet or an intranet, which have a sufficient bandwidth for sending and receiving the camera control signal and the signal of the compressed image data.

It should be noted that in the illustrated example, network protocol is assumed to be TCP/IP (UDP/IP) protocol, and hence hereinafter the term "address" is used to indicate an IP address. Further, the network camera 101 and the PC 103 are assumed to be assigned respective IP addresses.

FIG. 3 is a block diagram of the internal construction of the PC appearing in FIG. 1. As shown in FIG. 3, the PC 103 is comprised of a communication control unit 301, an image expansion unit 302, a panoramic image generation unit 303, the image display unit 304, a display control unit 305, and a command generation unit 306.

The PC 103 generates a camera control command for controlling the network camera 101, using the command generation unit 306, and sends the command via the communication control unit 301. Further, the PC 103 receives via the communication control unit 301 the compressed image data sent from the network camera 101, expands the data using the image expansion unit 302, and displays the resulting image on the image display unit 304.

Further, in the panoramic image generation mode, the panoramic image generation unit 303 connects a plurality of images (image data) to form a panoramic image. The generated panoramic image is displayed on the image display unit 304, and the user is capable of performing cameral control, image data storage, and so forth, by GUI (Graphical User Interface) operation on the image display unit 304. The display control unit 305 controls the screen display and operations.

Figure 4:
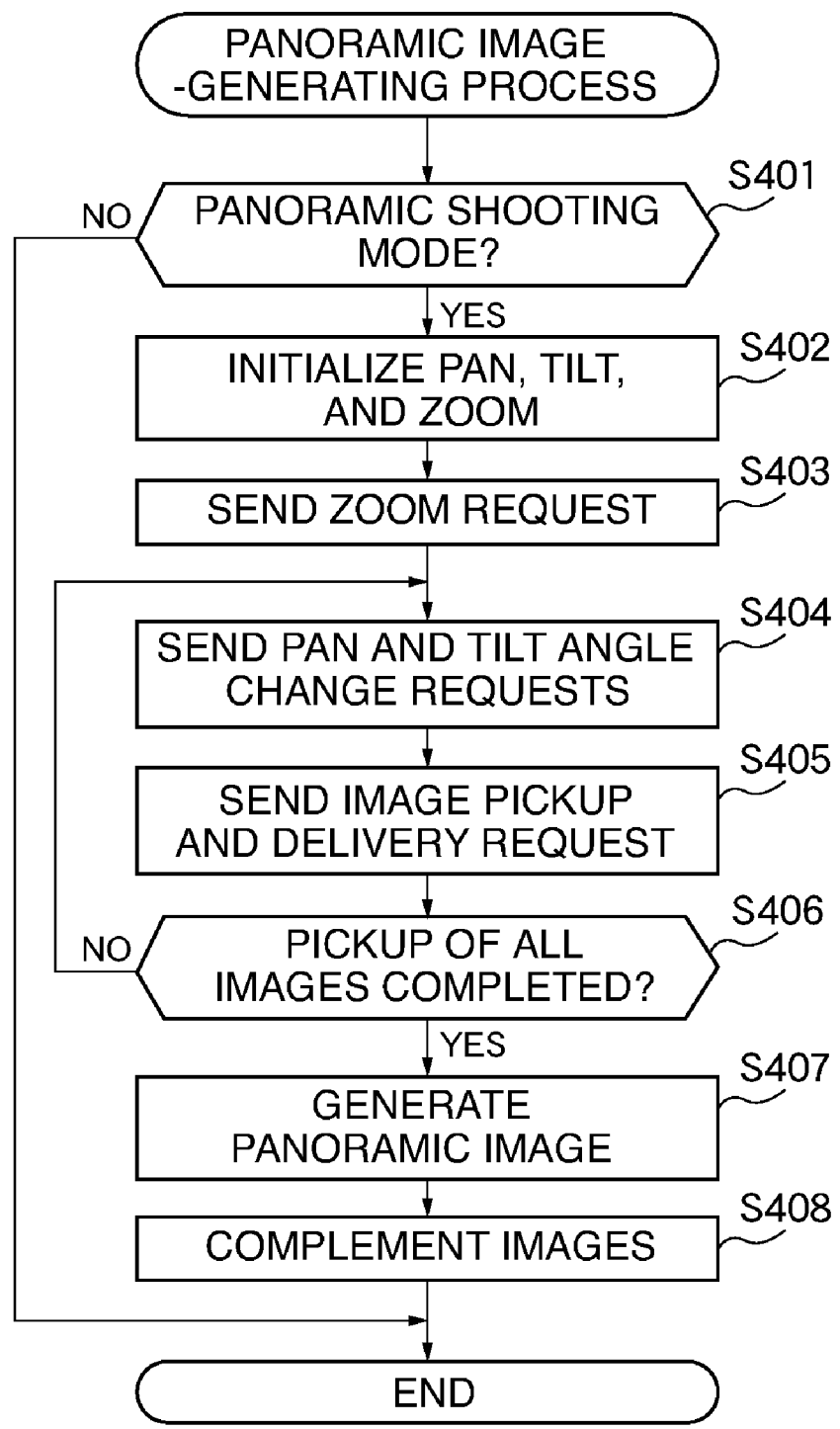
FIG. 4 is a flowchart showing a panoramic image-generating process executed by the network camera system.

FIG. 4 is a flowchart of a panoramic image-generating process executed by the network camera system according to the first embodiment.

Now, a description will be given of the operation of the network camera system according to the present embodiment with reference to the FIG. 4 flowchart. FIG. 5 shows the format of packets of camera control commands which are generated by the PC 103 and sent over the network 102. To be precise, the format of TCP/IP, UDP/IP or the like is used for packets, but FIG. 5 shows only portions of packet information necessary for description of the present embodiment.

Referring to FIG. 4, it is determined in a step S401 whether or not the user has pushed a panoramic shooting button (not shown) of the GUI on the image display unit 304 of the PC 103 to shift the network camera system to the panoramic shooting mode. If the network camera system has not shifted to the panoramic shooting mode (NO to S401), the present processing is immediately terminated, whereas if the network camera system has shifted to the panoramic shooting mode (YES to S401), the process proceeds to a step S402.

In the step S402, the PC 103 sends respective requests for initializing a panning value and a tilting value to the network camera 101, whereby the network camera 101 is caused to shift to its home position. At this time, the command generation unit 306 generates a pan angle change request packet shown in FIG. 5B in which θ=0 is set, and a tilt angle request packet shown in FIG. 5C in which φ=0 is set. These packets are sent via the communication control unit 301 to the network camera 101.

The network camera 101 receives the request packets via the communication control unit 206, interprets the contents of the request by the command interpretation unit 207, and changes the pan value and the tilt value of the movable panhead 202 by the camera and panhead control unit 203.

Further, the command generation unit 306 also generates a zoom packet, and sends the same to the network camera 101, whereby the wide-angle lens of the network camera 101 is caused to move to a wide end. At this time, a zoom request packet of FIG. 5A is sent in which a zoom magnification x is set to 1.

Further, in a step S403, the PC 103 sends a zoom request packet to the network camera 101, to thereby cause the wide-angle lens to be moved to a position where distortion is reduced. At this time, in the zoom request packet, x=xd is set, wherein xd represents a zoom magnification of the wide-angle lens with which distortion of the wide-angle lens is most reduced.

Figure 6A:
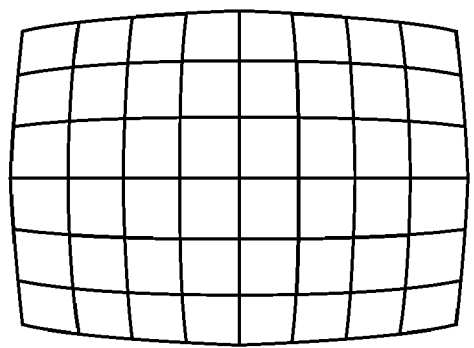
Figure 6B:
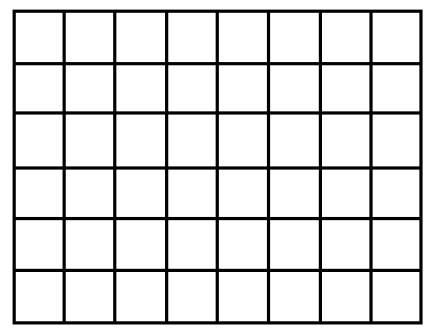

FIGS. 6A and 6B show how distortion is reduced. FIG. 6A shows an image which is formed when the lens is at the wide end (x=1), and suffers barrel distortion. In contrast, FIG. 6B shows an image formed when zooming is executed up to a position where the distortion is reduced.

Next, in steps S404, S405, and S406, the PC 103 controls the pan and tilt angles by delivering a pan angle change request packet and a tilt angle change request packet, and delivers a still image pickup and delivery request packet shown in FIG. 5D to thereby obtain a still image picked up by the network camera 101.

Figure 7:
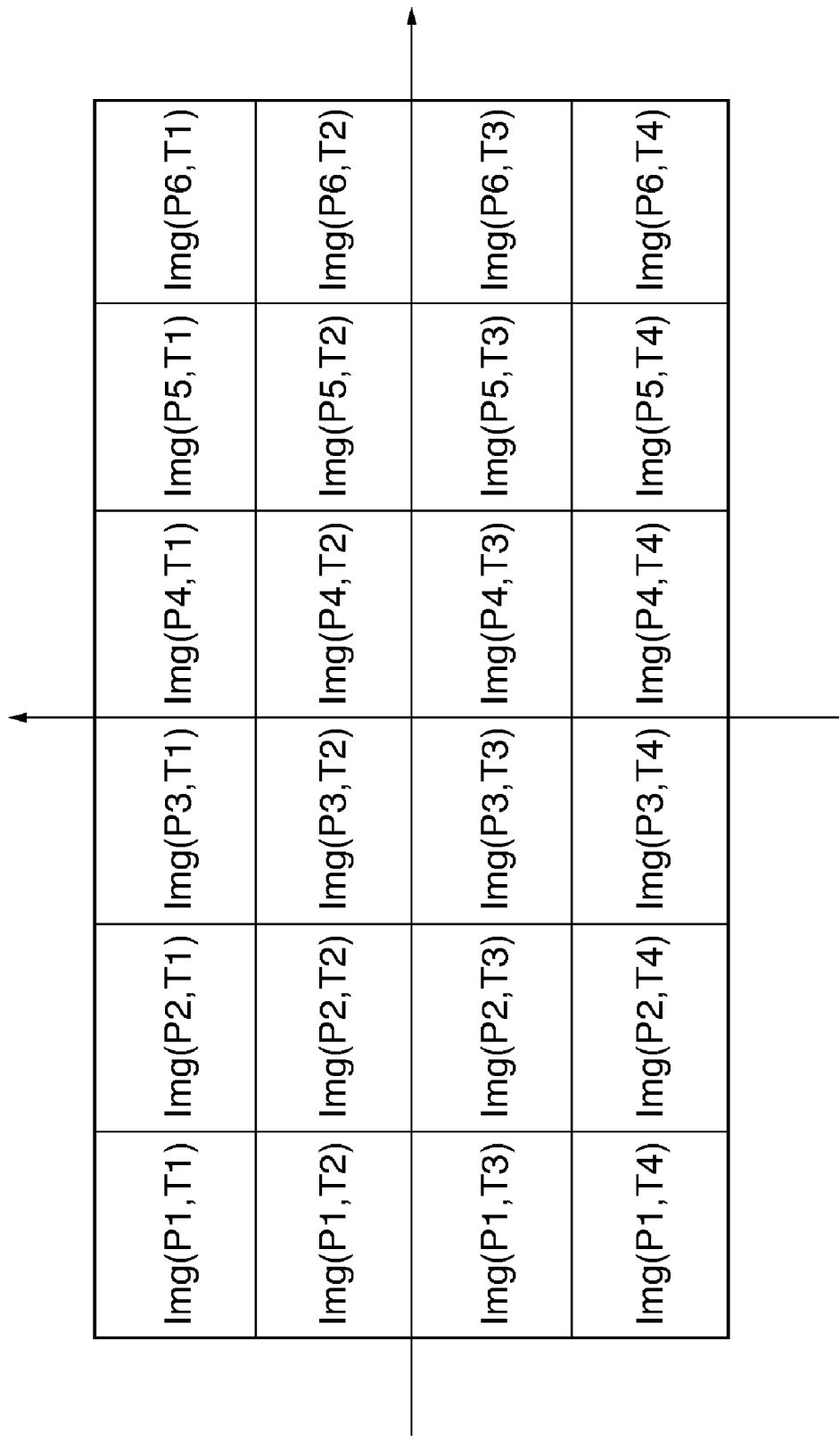
FIG. 7 is a view of a panoramic image formed by the FIG. 4 panoramic image-generating process.

These steps will be explained with reference to FIG. 7. In FIG. 7, the panoramic image is assumed to be formed by a total of 24 images which are arranged in 4×6 (four rows and six columns). A symbol Img(P1, T1) at an upper left corner of FIG. 7 indicates an image picked up by the network camera 101 after the network camera 101 receives a first pan angle change request packet and a first tilt angle change request packet from the PC 103 to change the pan and tilt angles, and then successively receives a still image pickup and delivery request packet from the same.

More specifically, at this time, in the pan angle change request, θ is set to a maximum negative angle which the movable panhead 202 can take, and in the tilt angle change request, φ is set to a maximum positive angle which the movable panhead 202 can take. Then, only the pan value is changed in an increasing direction to pick up an image Img (P2, T1). The above process is repeatedly carried out until pickup of an image Img(P6, T1) is finished, and then only the tilt value is changed in a decreasing direction to pick up an image Img(P6, T2). Thereafter, only the pan value is changed in a decreasing direction to pick up an image Img(P5, P2).

In the steps S404, 405, and 406, the above-described sequence is repeated until an image Img(P1, T4) is finally picked up. Then, in a step S407, the panoramic image generation unit 303 generates a panoramic image by connecting all the acquired still images.

It should be noted that the panoramic image generated here is assumed to have a coordinate system of which coordinates corresponding to a point within the panoramic image are linear to the pan and tilt angles, respectively. In other words, the coordinates at each position on the panoramic image are in proportional relation to the pan and tilt angles, respectively. The above process can be described using mathematical expressions as follows:

An entire range from which images can be picked up using the network camera 101 by panning and tilting thereof is divided into a plurality of regions. In doing this, the range is divided such that each region has a size just corresponding to an image angle range of the network camera 101. The divided regions may overlap more or less. Assuming that the number of divisions in the pan direction is set to n, and the number of divisions in the tilt direction is set to m, the images obtained from the regions can be expressed using pan angles and tilt angles as follows:

Img(P1, T1), Img(P2, T1), . . . , Img(Pn, T1)
Img(P1, T2), Img(P2, T2), . . . , Img(Pn, T2)
. . .
Img(P1, Tm), Img(P2, Tm), . . . , Img(Pn, Tm)

Figure 8:
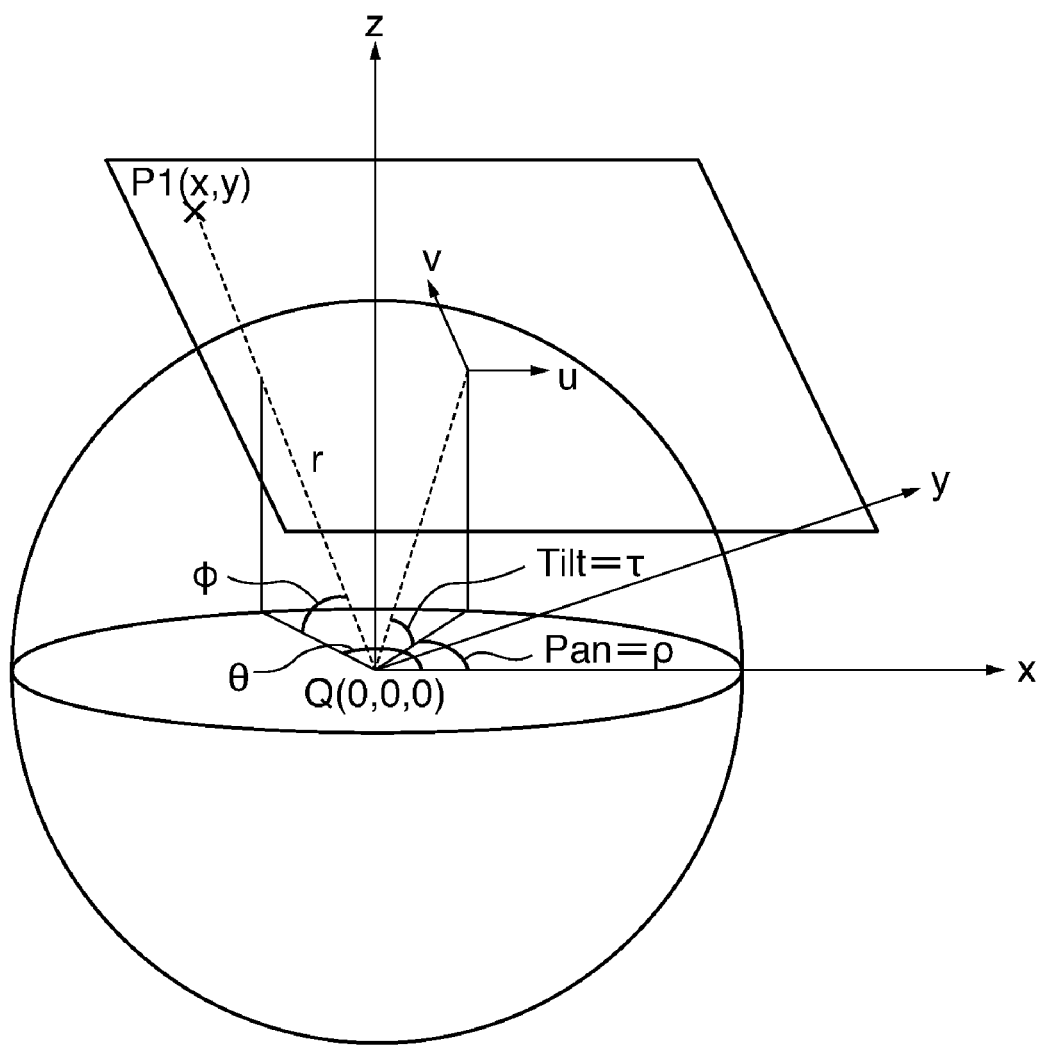
FIG. 8 is a view of a polar coordinate system.

In FIG. 7, it is assumed that n is equal to 6, and m is equal to 4. Now, from the thus acquired images, a panoramic image is generated by gnomonic projection, which is a method of projection employed in forming maps (see FIG. 8).

More specifically, the viewpoint (represented by Q) in gnomonic projection is placed in the pan-tilt center Q(0, 0, 0), and coordinates of a point on an image plane (plane of an image) determined by arbitrary pan and tilt angles (ρ, τ) is represented by P1(x, y). When the image is placed on a sphere with a radius of R about the center of the viewpoint Q such that the image is tangent to the sphere, coordinates of a point where a straight line connecting between P1(x, y) and the viewpoint Q intersects with the sphere is represented by polar coordinates as follows:

(R sin θ cos φ, R cos θ cos φ, R sin φ)

Then, in gnomonic projection, with m as a constant, there holds the following equations (1.1) and (1.2):

$$x = m \cdot R \cos\phi \sin(\theta-\rho) / \{\sin\phi \sin\tau + \cos\phi \cos\tau \cos(\theta-\rho)\} \quad (1.1)$$

$$y = m \cdot R(\sin\phi \cos\tau - \cos\phi \sin\tau \cos(\theta-\rho)) / \{\sin\phi \sin\tau + \cos\phi \cos\tau \cos(\theta-\rho)\} \quad (1.2)$$

It should be noted that when pan and tilt angles (ρ, τ) hold, the coordinates of a point on an image plane where the image plane and the sphere intersect with each other is set to the origin (0, 0) of the image plane. Here, an entire image pickup range available by panning and tilting can be represented by a range of angles in the pan direction between θmin and θmax and a range of angles in the tilt direction between φmin and φmax.

It is to be understood that these ranges of angles do not indicate respective movable ranges of the camera in the pan direction and the tilt direction, but indicate ranges of angles formed by adding image angles of the camera to those ranges. In other words, assuming that the pan and tilt limits are represented by Pmin, Pmax, Tmin and Tmax, and the vertical image angle and the horizontal image angle of the camera are represented by Ah and Av, there hold the following equations:

$$\theta\text{min} = P\text{min} - Ah/2$$

$$\theta\text{max} = P\text{max} + Ah/2$$

$$\phi\text{min} = P\text{min} - Av/2$$

$$\phi\text{max} = P\text{max} + Av/2$$

When the numbers of pixels in horizontal and vertical directions of a panoramic image desired to be formed by synthesis (connection of images) are represented by H and V, respectively, image angles corresponding to one pixel in the pan direction and the tilt direction are represented by the respective following equations (2.1) and (2.2):

$$\Delta\theta = (\theta\text{max} - \theta\text{min})/H \quad (2.1)$$

$$\Delta\phi = (\phi\text{max} - \phi\text{min})/V \quad (2.2)$$

In other words, a pixel (i, j) on the panoramic image can be expressed by pan and tilt angles (θ, φ) as follows:

$$(\theta, \phi) = (\theta\text{min} + \Delta\theta \times i, \phi\text{min} + \Delta\phi \times j)$$

provided that:

i=0, 1, 2, ..., H−1 j=0, 1, 2, ..., V−1

Accordingly, from these pan and tilt angles (θ, φ) and pan and tilt angles to be taken when an image Img(Pa, Pb) is to be picked up:

$$(\rho, \tau) = (Pa, Tb)$$

provided that a=1, 2, ..., n, and b=1, 2, ..., m, and using the equations (1.1), (1.2), (2.1), and (2.2), which coordinates on the panoramic image the coordinates (x, y) of a point on the image Img(Pa, Tb) correspond to are determined. In other words, assuming that coordinates of a point on the panoramic image are represented by XP and YP, if the conversion of coordinates on an original image to coordinates on the panoramic image is represented by F, mapping of the coordinates of a point on an original image to the coordinates of a point on the panoramic image can be represented by the following equation (3):

$$(XP, YP) = F(x, y, Pa, Tb) \quad (3)$$

Therefore, pixels values at the coordinates (XP, YP) of a point (pixel) on the panoramic image can be substituted by pixel values of a corresponding point on the original image Img(Pa, Tb). When pixels values are thus determined for all pixels (i, j) on the panoramic image, it is possible to obtain a panoramic image having a coordinate system whose coordinates are linear to pan and tilt angles, respectively. Thus, it is possible to obtain a panoramic image by connecting a plurality of images free from distortion to each other.

Next, in a step S408, complementing of images at ends of the panoramic image is performed. This is required because the panoramic image obtained up to the step S407 in the above-described process does not cover the original viewable range of the network camera 101 since the zoom control is executed in the step S402.

The reason for complementing of images at the ends of the panoramic image will be further explained with reference to FIG. 9.

Figure 9:
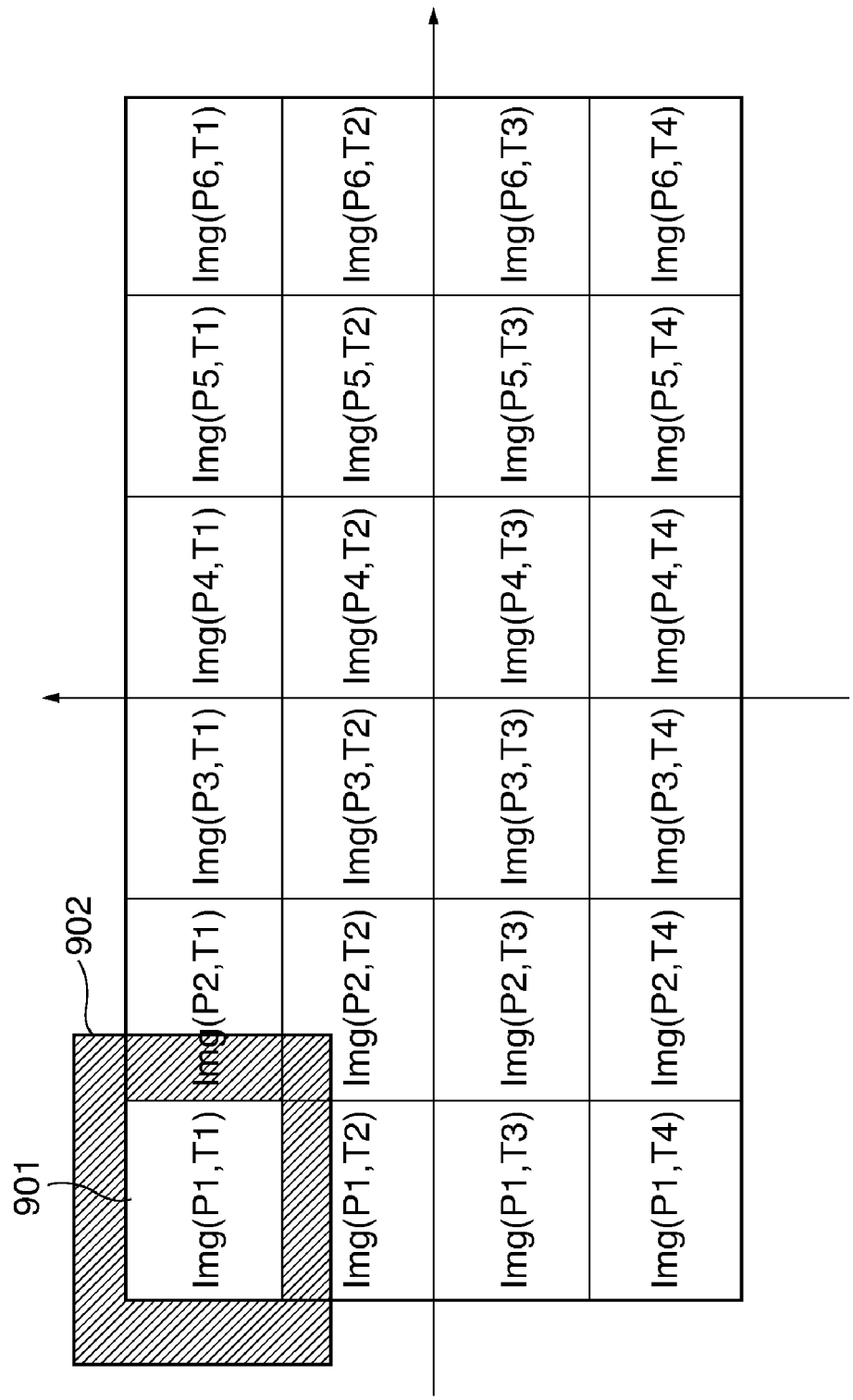
FIG. 9 is a view of regions outside a range from which an image is picked up by the network camera controlled by the FIG. 4 panoramic image-generating process.

FIG. 9 shows a still image 901 acquired in the step S405 and a still image 902 picked up when the wide-angle lens is caused to be positioned at the wide end at the same pan and tilt angles as in the case where the still image 901 is picked up. In other words, hatched regions extending leftward and upward off the still image 901 are not picked in the image pickup steps of the panoramic image-generating process described above.

To solve the problem, the complementing of images at the ends of the panoramic image is performed in the step S408. In the present embodiment, the complementing of images is performed by a method of copying image portions at ends of the panoramic image.

Figure 10:
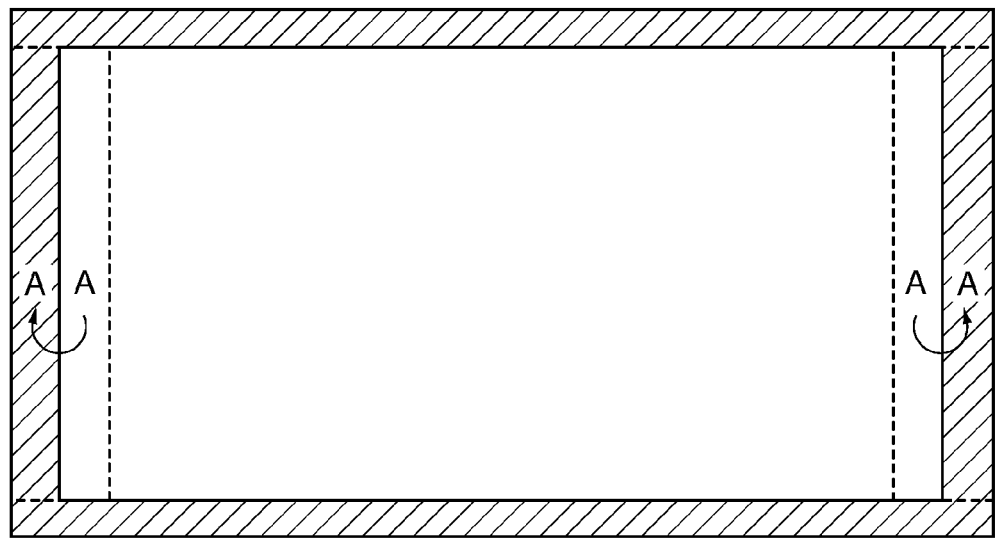
FIG. 10 is a view illustrating a method of image complementation executed in the FIG. 4 panoramic image-generating process, in which images at horizontal ends are copied.
Figure 11:
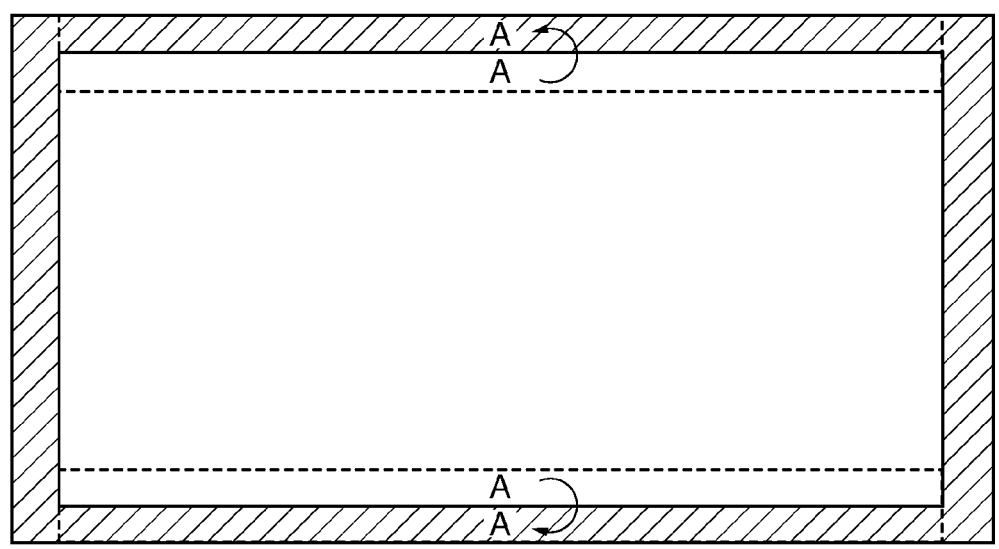
FIG. 11 is a view illustrating a method of image complementation executed in the FIG. 4 panoramic image-generating process, in which images at vertical ends are copied.
Figure 12:
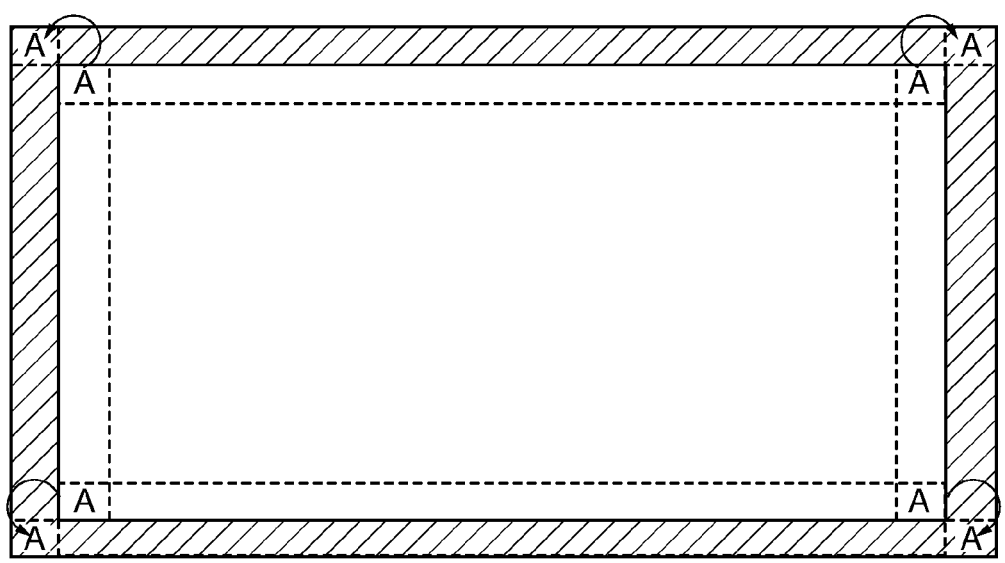
FIG. 12 is a view illustrating a method of image complementation executed in the FIG. 4 panoramic image-generating process, in which images at four corners are copied.

FIG. 10 shows an image complementing method in which image portions at opposite horizontal ends of the panoramic image are copied. FIG. 11 shows an image complementing method in which image portions at opposite vertical ends of the panoramic image are copied. FIG. 12 shows an image complementing method in which image portions on four corners of the panoramic image are copied.

Although in the present embodiment, the complementing of images is performed by a method of copying image portions at ends of the shot panoramic image, this is not limitative. By performing panoramic shooting according to the above-described panoramic image-generating process, it becomes possible for even the system comprising the network camera 101 having a wide-angle lens and the PC 103 to pick up and use a plurality of still images having little distortion, to thereby obtain a panoramic image by smooth or seamless connection of the images.

In the first embodiment, as shown in FIG. 7, all images are picked up with the same zoom magnification to generate a panoramic image, and as shown in the step S408 in FIG. 4, images for regions from which images cannot be picked up are complemented by image processing.

However, depending on a wide-angle lens, even if the position of the lens is moved only by a small distance, distortion is not reduced much. In such a case, if too much zooming is executed to eliminate distortion, hatched regions illustrated in FIG. 9 become too large.

A network camera system according to a second embodiment of the present invention generates a panoramic image, even with a wide-angle lens having the problem of such a large distortion, by picking up images while changing the zoom magnification by changing the respective values of the pan and tilt angles. This makes it possible to form a panoramic image by smooth or seamless connection of the images without requiring the complementing processing in the step S408 described hereinabove with reference to in FIG. 4. The network camera system according to the second embodiment has the same hardware configuration as that of the network camera system according to the first embodiment, and hence corresponding parts are designated by the same reference numerals, while omitting detailed description thereof.

Figure 13:
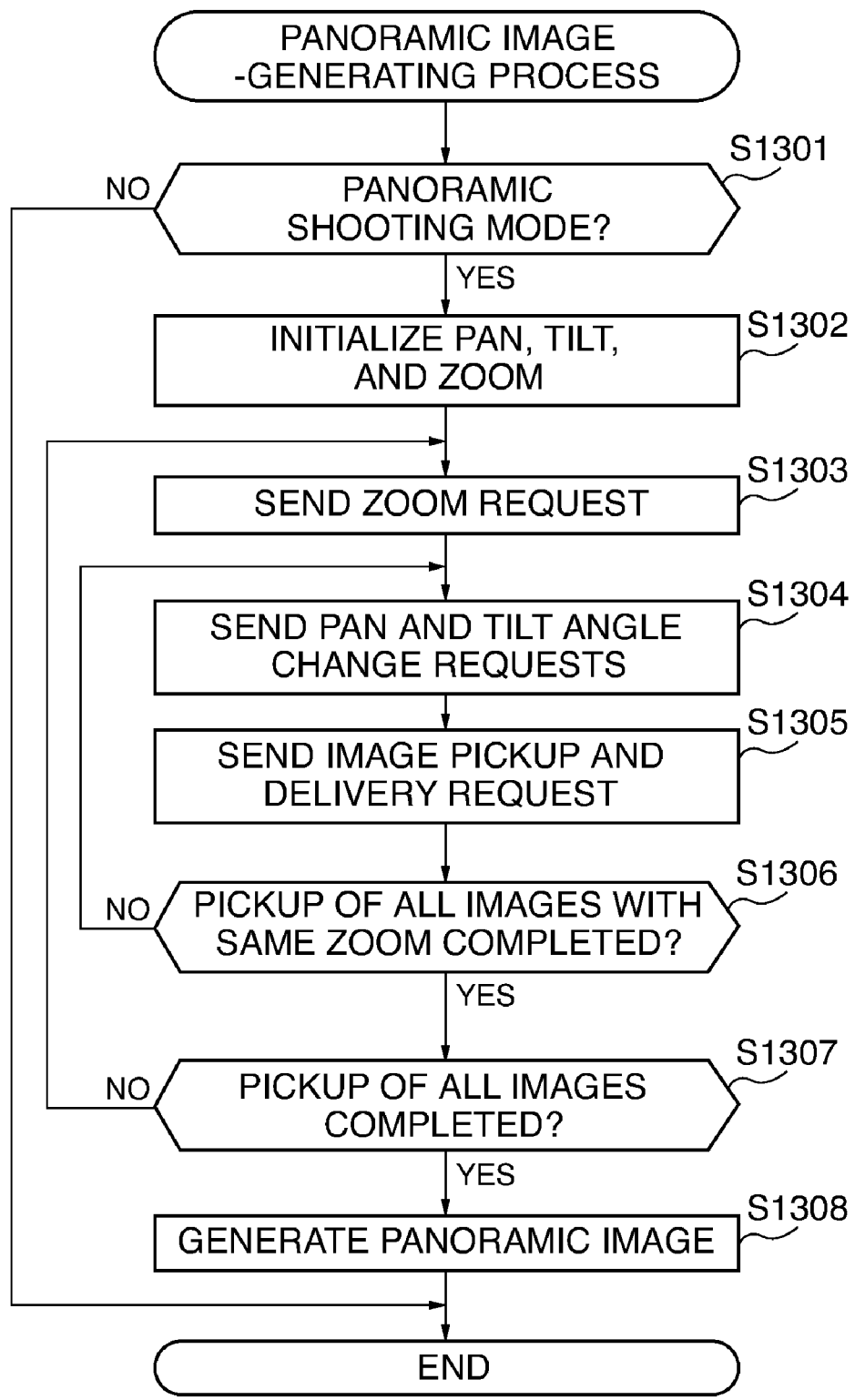
FIG. 13 is a flowchart showing a panoramic image-generating process executed by a network camera system according to a second embodiment of the present invention.

FIG. 13 is a flowchart of a panoramic image-generating process executed by the network camera system according to the second embodiment.

In the second embodiment, panoramic shooting is performed by changing the zoom magnification in three steps. FIG. 14 shows still images picked up and a panoramic image generated therefrom. In doing this, when the user designates a panoramic image generation range, zoom control is carried out by determining a zoom magnification based on the panoramic image generation range such that a panoramic image can be generated from only a plurality of images picked up by the network camera 101.

In FIG. 13, steps S1301 and S1302 are the same as the steps S401 and S402 in FIG. 4, and hence description thereof is omitted. In a step S1303, a first zoom request is sent to the network camera 101. At this time, the zoom request is such that the wide-angle lens should be positioned at a wide end.

Subsequently, in respective steps S1304, S1305, and S1306, images Img(P1n, T1m) wherein n=1, 2, ..., 6, and m=1, 2, ..., 4 hold are sequentially picked up. In other words, a total of 20 images are picked up except images Img(P13, T12), Img(P14, T12), Img(P13, T13), and Img(P14, T13) in a central portion.

Next, returning to the step S1303, a second zoom request is sent to the network camera 101. The zoom request at this time is such that the image angle should be changed to ⅔ of the present image angle. Then, in the steps S1304, S1305, and S1306, images Img(P2n, T2m) wherein n=1, 2, 3, and m=1, 2, 3 shown in FIG. 14 are picked up. In other words, a total of eight images except one Img(P22, T22) are shot.

Next, returning to the step S1303 again, a final zoom request is sent to the network camera 101. The zoom request at this time is such that the image angle is changed to ⅔ of the present image angle. Then, in the steps S1304, S1305, and S1306, a total four images Img(P3n, T3m) wherein n=1, 2, and m=1, 2 hold are picked up.

This completes the pickup of all images (S1307), and in the following step S1308, a panoramic image is generated using a total of thirty-two still images thus obtained according to the aforementioned gnomonic projection, followed by terminating the present process.

In the present embodiment, images at ends of the panoramic image are picked up with the wide-angle lens positioned at the wide end, and hence differently from the first embodiment, it is not necessary to perform complementing of images. Further, in the present embodiment, image pickup is performed by increasing the zoom magnification depending on the pan and tilt position, whereby it is possible to smoothly connect the central portions of the panoramic image.

Although in the preset embodiment, zooming is performed such that distortion of central ones of a plurality of images forming a panoramic image is most reduced, and images closer to the periphery are picked up by zooming with a lower zoom magnification, by way of example, this is not limitative, but inversely, zooming may be performed such that distortion of peripheral ones of a plurality of images forming a panoramic image is most reduced, and images closer to the center of the panoramic image are picked up by zooming with a lower zoom magnification. In this case, to form a panoramic image corresponding to the entire viewable range, the complementing processing in the step S408 in the panoramic image-generating process in FIG. 4 is carried out.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2006-281525 filed Oct. 16, 2006, which is hereby incorporated by reference herein in its entirety.

What is claimed is:

1. A network camera system comprising:
   an image pickup device that has a wide-angle lens which can be controlled for panning, tilting, and zooming; and
   a control unit that is connected to said image pickup device, via a network, for controlling said image pickup device, wherein said control unit comprises:
   a panoramic image generation unit configured to generate a panoramic image by connecting a plurality of images picked up by said image pickup device based on a coordinate system that is a function of pan and tilt angles of the image pickup device; and
   a zoom unit configured to change a zoom magnification of the image pickup device when the network camera system is in a panoramic shooting mode,
   wherein the control unit is configured to control the image pickup device to pickup one or more of the plurality of images after the zoom unit changes the zoom magnification, and
   wherein the zoom unit is configured to increase the zoom magnification as a position of the panning and tilting becomes closer to a center position, according to the coordinate system, of the panoramic image to be generated by the panoramic image generation unit.

2. A network camera system as claimed in claim 1, wherein when the position of the panning and tilting is defined as an edge position of the panoramic image to be generated by the panoramic image generation unit, said zoom unit is configured to change the zoom magnification to 1.

3. A method executed by a control unit of a network camera system, the network camera system including an image pickup device that has a wide-angle lens which can be controlled for panning, tilting, and zooming, the control unit connected to said image pickup device, via a network, for controlling said image pickup device, the method comprising:
   a panoramic image generation step of generating a panoramic image by connecting a plurality of images picked up by said image pickup device based on a coordinate system that is a function of pan and tilt angles of the image pickup device;
   a zoom step of changing a zoom magnification of the image pickup device when the network camera system is in a panoramic shooting mode; and
   a controlling step of controlling the image pickup device to pickup one or more of the plurality of images after the zoom unit changes the zoom magnification,
   wherein the zoom step includes increasing the zoom magnification as a position of the panning and tilting becomes closer to a center position, according to the coordinate system, of the panoramic image to be generated in the panoramic image generation step.

* * * * *